United States Patent [19]

Price

[11] Patent Number: 4,466,133
[45] Date of Patent: Aug. 14, 1984

[54] RADIO RECEIVER APPARATUS INCLUDING MULTIPATH FADE COMPENSATING ARRANGEMENT

[75] Inventor: Alistair J. Price, London, England
[73] Assignee: The General Electric Company, p.l.c., London, England
[21] Appl. No.: 379,938
[22] Filed: May 19, 1982
[30] Foreign Application Priority Data May 22, 1981 [GB] United Kingdom ................ 8115865
Feb. 22, 1982 [GB] United Kingdom ................ 8205148

[51] Int. Cl.$^3$ ............................................. H04B 1/10
[52] U.S. Cl. ................................. 455/303; 455/249; 455/266; 455/311; 455/340
[58] Field of Search ................. 455/52, 65, 239, 246, 455/249, 250, 266, 303, 306, 307, 340, 311; 375/12, 14

[56] References Cited

PUBLICATIONS

"Design Considerations for an Extended Range Adaptive Equalizer" by Hartmann et al., International Conferences on Communications, Denver, Colorado, Jun. 1981.

"Equipment Design and Performance of 6GHE SSB-AM System" by Nojima et al., Review of the Electrical Communication Lab. vol. 29, Nos. 11-12, Nov.-Dec. 1981.

Primary Examiner—Jin F. Ng
Attorney, Agent, or Firm—Kirschstein, Kirschstein, Ottinger & Israel

[57] ABSTRACT

In a radio receiver a multipath fade compensating circuit comprises a single-pole filter circuit the center frequency and Q of which are controlled in dependence upon the amplitudes of signal components in narrow frequency bands within the band of frequencies passed by the filter circuit. The narrow bands may be selected from an array by a microprocessor, or may be derived using variable frequency filters.

4 Claims, 8 Drawing Figures

RADIO RECEIVER APPARATUS INCLUDING MULTIPATH FADE COMPENSATING ARRANGEMENT

The present invention relates to receiver apparatus for radio transmission systems.

It is well known that microwave radio transmission systems are affected by propagation effects such as rain fading and multipath fading. The latter arises when there are several possible paths from transmitter to receiver, each having an associated time delay and attenuation. In the two-path case where there is a small difference in time delay between paths, signal cancellation will tend to occur at regular intervals of frequency, and it has been found that when one such cancellation or null occurs within a received radio frequency band, severe signal degradation can occur. In the vicinity of a null the group delay and amplitude frequency response of the channel can be well matched by a single zero tuned circuit. The position and depth of the null are determined by the delay difference and relative magnitudes of the two interfering signals and the corresponding parameters of the compensation network are frequency and Q respectively.

According to the present invention receiver apparatus for a radio transmission system in which propagation effects such as multipath fading may give rise to attenuation of signal components in a band of frequencies within the received signal frequency band comprises a network connected in the signal path of said receiver apparatus, means to derive signals representing the respective amplitudes of frequency components in predetermined narrow bands within the band of frequencies passed by said network, and means responsive to departures of said derived signals from predetermined values or relative values to control one or more parameters of said network such as to tend to reduce said attenuation.

Preferably said network comprises a single-pole tuned circuit.

The means responsive to departures of said derived signals from predetermined values may include a microprocessor. There may be provided means to derive signals representing the amplitudes of frequency components in three narrow frequency bands respectively near the lower and upper edges and in the middle of the band of frequencies passed by said network. The relative values of said derived signals in respect of the lower and upper narrow frequency bands may be used to control the centre frequency of said tuned circuit, while the value of the derived signal in respect of the middle narrow frequency band relative to the values of the other two derived signals may be used to control the Q of said tuned circuit.

According to another aspect of the present invention in receiver apparatus for a radio transmission system in which propagation effects such as multipath fading may give rise to attenuation of signal frequency components within the received signal frequency band, there is provided a network connected in the received signal path in said receiver apparatus, detector means to derive signals representing the respective amplitudes of signal frequency components in respective narrow bands spaced within the band of frequencies passed by said network, and means responsive to departures of said derived signals from predetermined values or relative values to control the centre frequencies of said narrow bands and to control one or more parameters of said network such as to tend to reduce the attenuation of said signal frequency components.

Preferably there are provided three detector means, and said means responsive to departures of said derived signals from predetermined values or relative values is arranged to vary the centre frequencies of the respective narrow frequency bands in the same sense and such that at least the centre frequency of the middle one of the three bands tends towards a frequency of greater attenuation within the received signal frequency band.

Receiver apparatus in accordance with the present invention will now be described by way of example with reference to the accompanying drawings, of which:

Figure 1:
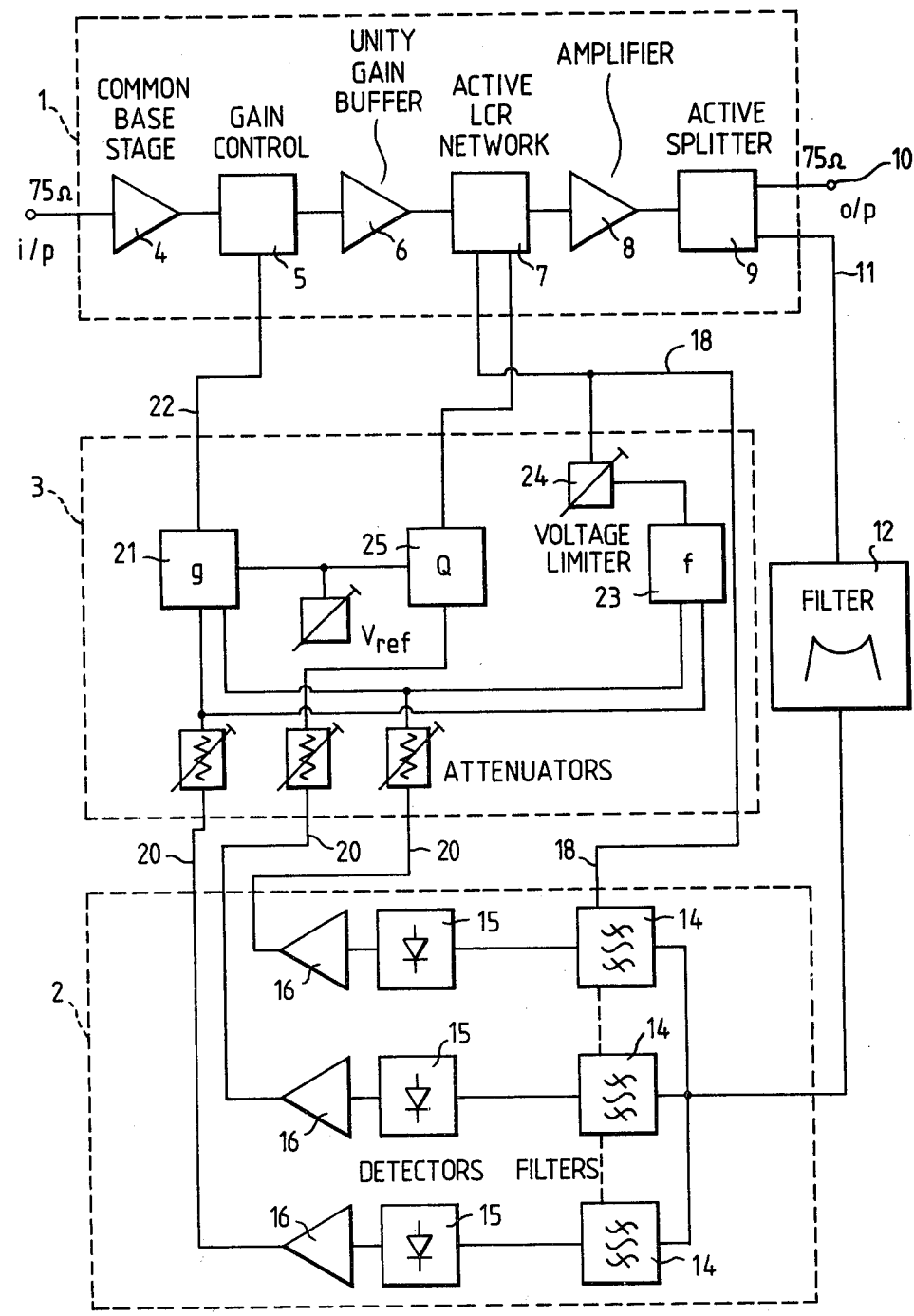
FIG. 1 shows part of the receiver apparatus schematically.
Figure 1A:
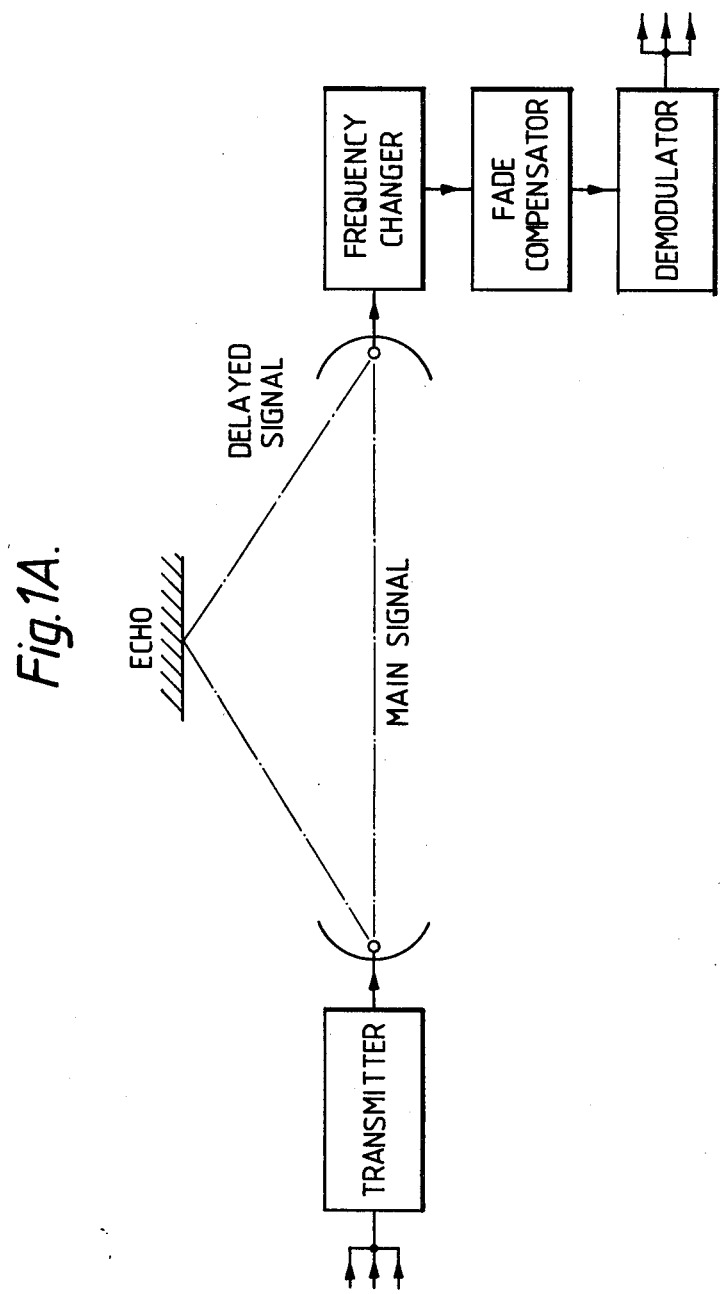
FIG. 1A shows schematically a radio transmission system including the receiver apparatus.

Referring first to FIG. 1 the apparatus is arranged to provide gain control and compensation for two-path fade at an intermediate-frequency stage of the receiver, operating over a frequency band some 90 MHz wide centered on 140 MHz. The apparatus comprises in outline a network 1 connected in the I.F. signal path of the receiver, a detector network 2 and a control arrangement 3.

Figure 2:
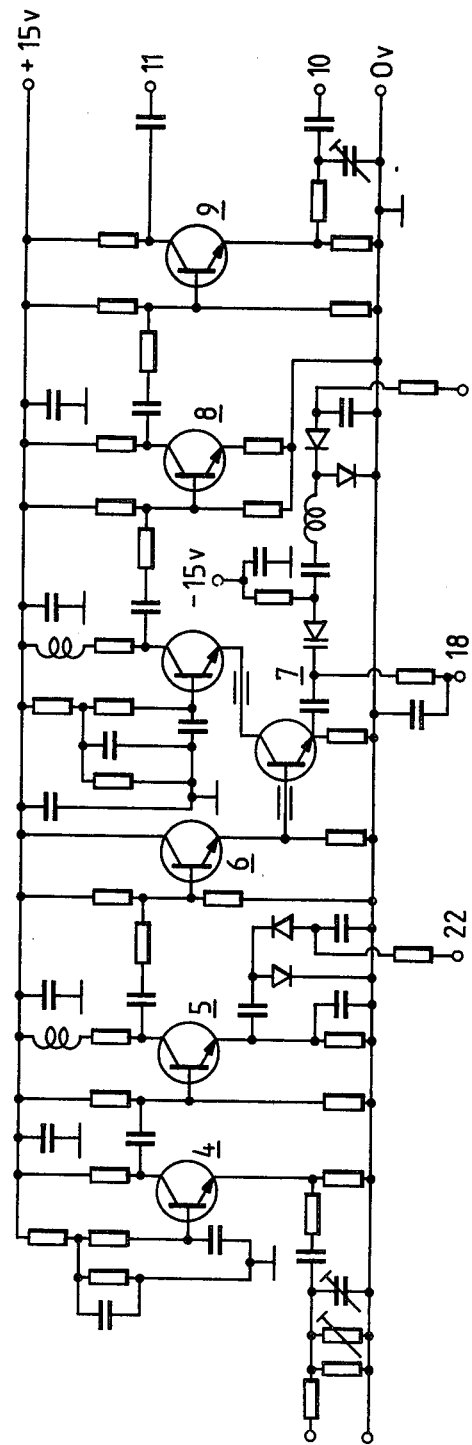
FIGS. 2, 3, 4 and 5 show detailed circuit diagrams of respective parts of the receiver apparatus shown in FIG. 1, and FIGS. 6 and 7 show amplitude against frequency characteristics illustrating the operation of the receiver apparatus.

The network 1, shown in greater detail in FIG. 2, comprises in cascade a common base amplifier stage 4, a gain control stage 5, a buffer amplifier 6, an active filter network 7 including the elements of a single-pole tuned circuit, a second buffer amplifier 8 and an output stage 9. The output stage 9 provides two outputs, one on a 75 ohm path 10 to the subsequent receiver circuits (not shown) and the other on a path 11 to a filter 12.

Figure 6:
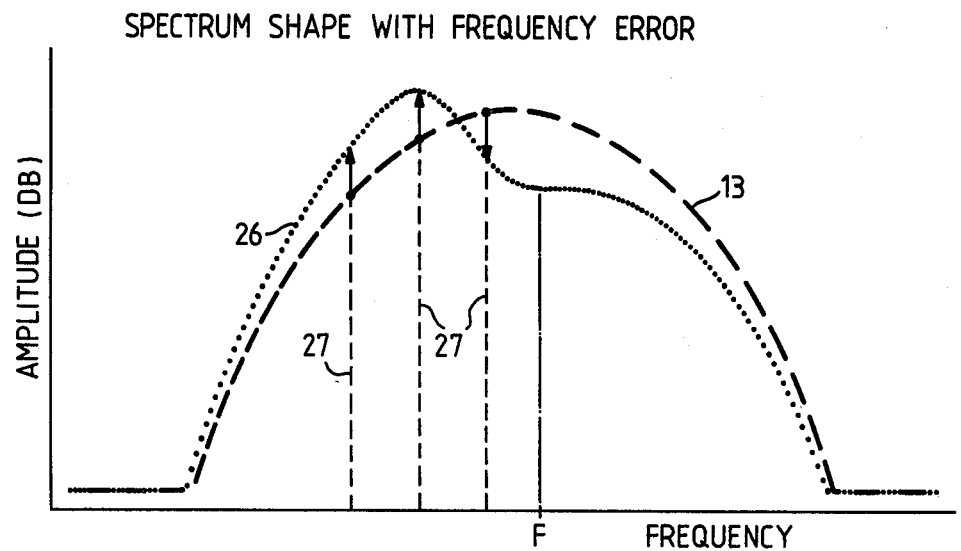
Figure 7:
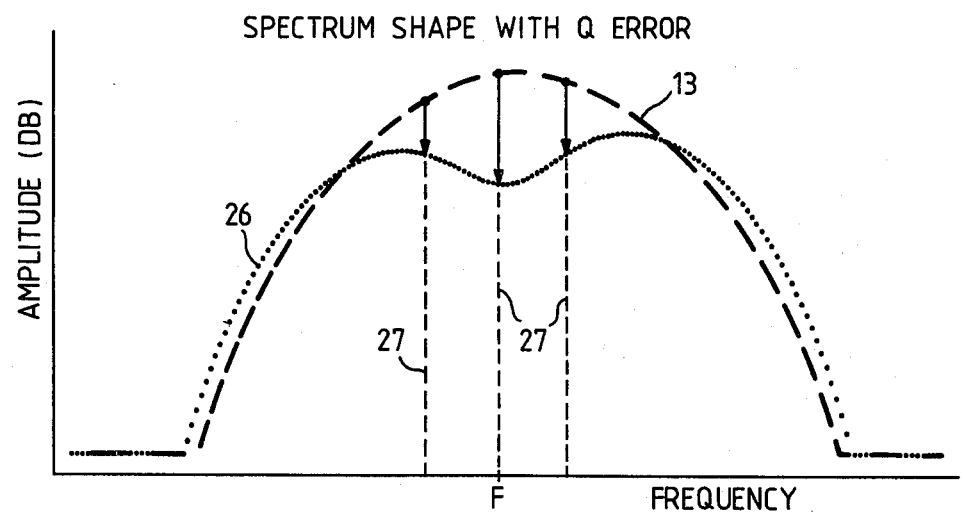

As indicated in FIGS. 6 and 7 by the amplitude/frequency characteristics 13 a normal received signal, with no fade, produces an intermediate frequency spectrum exhibiting a single rounded peak. For control purposes the filter 12 is arranged to produce from this a spectrum shape which is substantially flat over the major part of the IF band, so that any in-band cancellation or null in the received signals due to multipath fading will tend to show up as a "notch" or as a slope on this otherwise flat spectrum shape.

Figure 5:
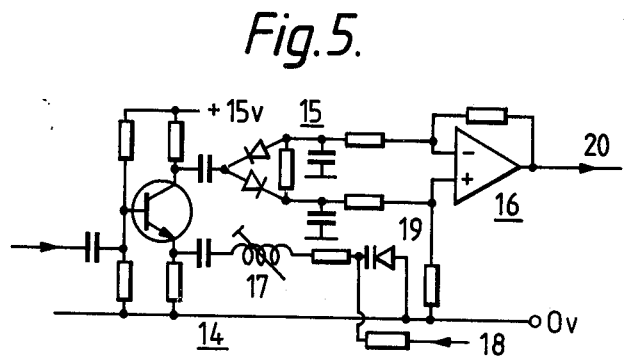

The network 2 includes three detectors each comprising a narrow-bandwidth active filter 14, a rectifier 15 and an amplifier 16, one of these detectors being shown in greater detail in FIG. 5. The three filters 14 are arranged to be tuned by means of respective preset inductors 17 to different frequencies in the intermediate frequency band, and these different frequencies are arranged to be variable in unison in dependence upon the value of a variable control voltage applied over a common path 18 to respective voltage-variable capacitors 19, which may for example be varactor diodes. The three detectors provide voltages, representing the amplitudes of frequency components in the respective narrow bands, to the control arrangement 3 over respective paths 20. In normal operation when there are no spectrum distortions these voltages are substantially equal and of a predetermined value.

Figure 3:
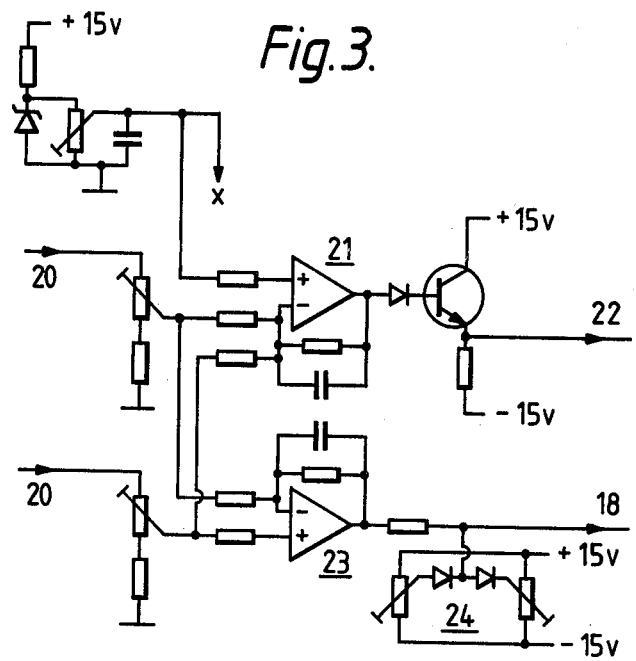
Figure 4:
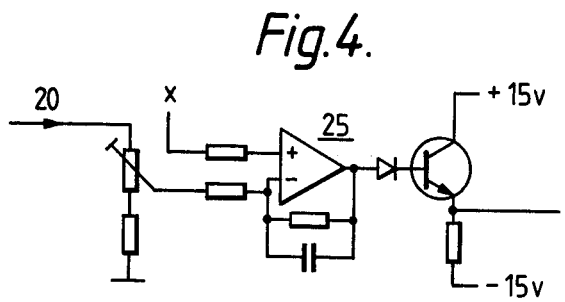

As shown in greater detail in FIG. 3, a gain control circuit 21 provides an output signal to the gain control stage 5 of the network 1 over a path 22 in dependence upon the mean value of the voltages from the upper and lower frequency detectors. A frequency control circuit 23 provides an output signal on the path 18 to the active filter network 7 and to the filters 14 which is dependent upon the difference between the voltages from the upper and lower frequency detectors, the maximum excursion of this frequency control output signal being limited by a network 24 to keep the centre frequencies of the filters 7 and 14 within the substantially flat part of the intermediate frequency spectrum. The effect of the frequency control voltage on the path 18 is to vary the frequencies of the filters 14, and the filter 7, towards any minimum in the normally flat spectrum, until the upper and lower frequency filters 14 are passing substantially equal amplitude frequency components on either side of the minimum. At this point the centre frequencies of the filter 14 of the middle detector and the centre frequency of the network 7 are substantially on the frequency of the minimum. The Q of th network 7 is then adjusted by a control circuit 25, shown in FIG. 4, in such a sense as to bring the output of the middle detector to a predetermined value corresponding to that from a flat spectrum at the output of the filter 12.

Referring to FIG. 6 the curve 26 illustrates the "unflattened" spectrum shape for a received signal with a multipath fade minimum at a frequency F. If the centre frequencies of the three detectors 14 are represented by the dashed lines 27 it will be seen that the upper-frequency detector will receive a lower than normal signal amplitude while the lower-frequency detector will receive a higher than normal signal amplitude. The frequency control circuit 23 will consequently vary the centre frequencies upwards in frequency until the upper and lower frequency detectors are receiving substantially equal amplitude signals, as illustrated in FIG. 7. The spectrum passed to the output stage 9 of the network 1 can then be restored substantially to the desired shape 13 by variation of the Q of the filter network 7 to raise the amplitude at the frequency F.

Since the frequencies at which the detectors operate at any time are close together distortion of the spectrum at frequencies outside their bandwidths will not affect them. Thus if two nulls or minima which are separated in frequency appear within the intermediate frequency band simultaneously, which might happen in the case of a large echo delay two-path fade, the network described above will tend to compensate reasonably well for just one of the nulls. A second similar network in cascade with the first could then compensate for the second null with little interaction between the two networks. Such networks in cascade also offer the possibility of compensating for spectrum distortions arising from other than simple two-path fades. At the same time the network described above may be combined with other networks, such as slope equalisers.

Although the network described above uses analogue control circuitry, the same effect could be achieved using a microprocessor. The spectrum flattening filter 12 might then be omitted and a look-up table used to define the required spectrum shape. The three variable frequency detectors could be replaced by an array of fixed frequency detectors spaced throughout the intermediate frequency band, with the relevant detectors being selected by the microprocessor.

I claim:

1. Receiver apparatus for radio transmission system in which propagation effects such as multipath fading may give rise to attenuation of signal frequency components within the received signal frequency band, said receiver apparatus including an intermediate frequency stage defining part of a received signal path through said apparatus, the apparatus comprising:
   (a) a fading compensation network connected to said intermediate frequency stage in said received signal path,
   (b) detector means,
   (c) means connecting said detector means to said fading compensation network to derive signals representing the respective amplitudes of signal frequency components in respective narrow bands spaced within the band of frequencies passed by said network,
   (d) circuit means responsive to departures of said derived signals from predetermined relative values, and
   (e) means responsive to outputs from said circuit means to control the center frequencies of said narrow bands and to control at least one parameter of said network such as to tend to reduce the attenuation of said signal frequency components.

2. Receiver apparatus in accordance with claim 1 wherein there are provided
   (a) three detector means, and
   (b) said circuit means responsive to departures of said derived signals from predetermined values is arranged to vary the center frequencies of the respective narrow frequency bands in the same sense and such that at least the center frequency of the middle one of the three bands tends towards a frequency of greater attenuation within the received signal frequency band.

3. Receiver apparatus in accordance with claim 1 wherein said network comprise a single pole tuned circuit.

4. Receiver apparatus in accordance with claim 3 wherein said narrow frequency bands comprise lower, middle and upper narrow frequency bands and the relative values of said derived signals from the lower and upper narrow frequency bands are used to control the center frequency of said single pole tuned circuit, while the value of the derived signal from the middle narrow frequency band relative to the values of the other two derived signals is used to control the Q of said single pole tuned circuit.

* * * * *